US012693164B2

(12) United States Patent
Ogilvie

(10) Patent No.:     US 12,693,164 B2
(45) Date of Patent:          Jul. 28, 2026

(54) BROADBAND PHASE-MODULATED FOURIER TRANSFORM SPECTROSCOPY

(71) Applicant: The Regents of The University of Michigan, Ann Arbor, MI (US)

(72) Inventor: Jennifer Ogilvie, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 93 days.

(21) Appl. No.: 18/945,980

(22) Filed: Nov. 13, 2024

(65) Prior Publication Data

US 2025/0155287 A1      May 15, 2025

Related U.S. Application Data

(60) Provisional application No. 63/548,438, filed on Nov. 14, 2023.

(51) Int. Cl.
| | |
|---|---|
| *G01J 3/453* | (2006.01) |
| *G01J 3/02* | (2006.01) |
| *G01J 3/433* | (2006.01) |
| *G01N 21/35* | (2014.01) |

(52) U.S. Cl.
CPC ............. *G01J 3/453* (2013.01); *G01J 3/0208* (2013.01); *G01J 3/433* (2013.01); *G01N 21/35* (2013.01); *G01N 2021/3595* (2013.01)

(58) Field of Classification Search
CPC .......... G01J 3/453; G01J 3/0208; G01J 3/433; G01N 21/35; G01N 2021/3595
See application file for complete search history.

(56) References Cited

U.S. PATENT DOCUMENTS

2022/0236547 A1* 7/2022 Qu ........................ G02B 21/006

\* cited by examiner

*Primary Examiner* — Jamil Ahmed
(74) *Attorney, Agent, or Firm* — Harness, Dickey & Pierce, PLC

(57) ABSTRACT

A phase-modulated approach for ultrabroadband Fourier transform electronic spectroscopy is presented. To overcome the bandwidth limitations and spatial chirp introduced by acousto-optic modulators (AOMs), pulses from a 1 μm laser are modulated using AOMs prior to continuum generation. This phase modulation is transferred to the continuum generated in an Yttrium Aluminum Garnet crystal. Separately generated phase-modulated continua in two arms of a Mach-Zehnder interferometer interfere at the difference of their modulation frequencies, enabling physical under-sampling of the signal and the suppression of low-frequency noise. By interferometrically tracking the relative time delay of the continua, one can perform continuous, rapid-scanning Fourier transform electronic spectroscopy with a high signal-to-noise ratio and spectral resolution.

17 Claims, 7 Drawing Sheets

BROADBAND PHASE-MODULATED FOURIER TRANSFORM SPECTROSCOPY

CROSS-REFERENCE TO RELATED APPLICATIONS

This application claims the benefit of U.S. Provisional Application No. 63/548,438, filed on Nov. 14, 2023. The entire disclosure of the above application is incorporated herein by reference.

GOVERNMENT CLAUSE

This invention was made with government support under FA9550-18-1-0343 awarded by the Air Force Office of Scientific Research. The government has certain rights in the invention.

FIELD

The present disclosure relates to Fourier transform spectroscopy.

BACKGROUND

In its most common implementation, Fourier transform (FT) spectroscopy employs two replicas of an optical field with a variable time delay to measure a spectral response in the time-domain. Upon Fourier transformation of the time-domain interferogram, the spectrum is retrieved in the frequency domain. Compared to dispersive spectrometers, Fourier transform spectrometers avoid grating losses and can offer higher signal-to-noise ratios under some conditions, a fact that is known as "Fellgett's advantage". They can also offer higher spectral resolution. Additionally, all wavelengths are simultaneously measured on a single element detector, which can offer faster read-out speeds than multi-element arrays. Recently, wide-field hyperspectral imaging has been achieved via Fourier transform spectroscopy from every pixel of a camera. Fourier transform spectroscopy optimizes the time-frequency resolution trade-off, and forms the basis for the powerful multidimensional Fourier transform spectroscopies that originated in the NMR community and are now widely used in the infrared and visible regimes. Fourier transform spectroscopy requires interferometric precision with path length stabilities of ~$\lambda$/100 to obtain reliable frequency axes and separate complex signal components with high signal-to-noise ratios. Conventional Mach-Zehnder (MZ) or Michelson interferometers work well in the infrared, where the wavelengths are long, but are often unstable in the visible regime. Common solutions to ensure interferometric stability in the visible regime for electronic spectroscopy include birefringent interferometers, passive or active stabilization, spectrometers based on gratings, pulse shapers as well as interferometric tracking of the delay. Phase-modulation is an alternative approach that improves the stability by decoupling the time delay of an optical pulse pair from its relative phase. Phase-modulation Fourier transform spectroscopy (PM-FTS) has been used in a variety of techniques, including fluorescence-detected wavepacket interferometry, as well as a growing number of multidimensional spectroscopies, including coherent and "action-detected" modalities. Action-detected PM-FTS methods have employed fluorescence, photocurrent and photo-ion detection. The extreme sensitivity of PM-FTS-based multidimensional spectroscopy has been demonstrated through measurements of dilute gases and solutions as well as ultracold atoms. Phase-modulation has also enabled spatially-resolved multidimensional spectroscopic measurements.

In phase-modulation, an acousto-optic modulator (AOM) imparts a distinct radio frequency (RF) shift, modulating the pulse-to-pulse carrier-envelope phase. Linear or non-linear spectroscopic signals of interest can be isolated using lock-in detection, super-heterodyne mixing, and digital lock-in approaches, as well as methods optimized for rapid imaging applications. However, AOMs decrease in efficiency with increasing bandwidth of the input light. In addition, the different wavelengths will diffract at slightly different angles, imparting spatial chirp. Spatial chirp can be reduced through careful optimization of focusing conditions, and can be overcome by double-passing the AOM at the expense of throughput. These considerations limit the spectroscopic bandwidth that can be achieved with AOM-based techniques. Expanding the bandwidth of PM-FTS would broaden its applications in multiple techniques, such as linear and multidimensional spectroscopy and hyperspectral imaging. Here, an approach is presented that circumvents the bandwidth limitations of AOMs by applying the modulation to the pump laser prior to continuum generation, producing broadband pulses that are modulated at the AOM frequency.

This section provides background information related to the present disclosure which is not necessarily prior art.

SUMMARY

This section provides a general summary of the disclosure, and is not a comprehensive disclosure of its full scope or all of its features.

A method is provided for analyzing a sample using spectroscopy. The method includes: generating a pulsed light beam; splitting the pulsed light beam into two light paths; phase modulating the pulsed light beam in at least one of the two light paths, such that the pulsed light beam in each of the two light paths is modulated at a different frequency; spectrally broadening the pulsed light beam in each of the two light paths, where the spectrally broadening of the pulsed light beam occurs downstream from the phase modulation; delaying the pulsed light beam in one of the two light paths, where the delaying of the pulsed light beam occurs downstream from the spectral broadening; recombining the pulsed light beam from each of the two light paths to form a sample output signal; disposing the sample a light path downstream from the spectral broadening; and detecting the output signal with a detector.

In another aspect, a system is presented for analyzing a sample using spectroscopy. The system includes: a laser configured to generate a pulsed light beam; a beamsplitter configured to receive the pulsed light beam from the laser and split the pulsed light beam into two light paths; a first modulator disposed in a first light path of the two light paths and operates to phase modulate the pulsed light beam therein at a first frequency; a second modulator disposed in a second light path of the two light paths and operates phase modulate the pulsed light beam therein at a second frequency which differs from the first frequency; a first continuum generator disposed on the first light path downstream from the first modulator and operates to spectrally broaden the pulsed light beam; a second continuum generator disposed on the second light path downstream from the second modulator and operates to spectrally broadening the pulsed light beam; a delay mechanism disposed in the second light path downstream from the second continuum generator and operates to delay the pulsed light beam; a beam combiner configured to receive the pulsed light beam from the first continuum generator and the second continuum generator and operates to form an output signal; and a first detector configured to detect the output signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 7A:
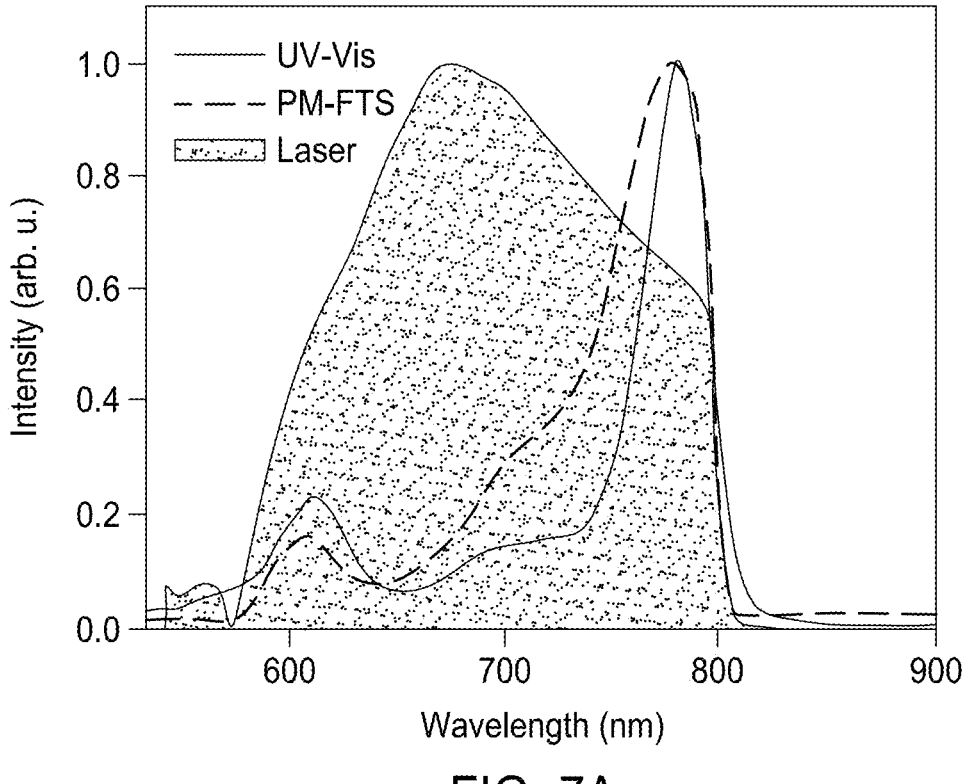

FIG. 7A is a graph showing Fluorescence excitation spectra of biological samples measured via PM-FTS. Linear fluorescence excitation spectra of BChl a (dashed line) along with linear absorption spectra recorded by a commercial UV-Vis spectrometer (solid line). The cross-correlation laser spectrum acquired via PM-FTS that was used to perform the experiment is also shown by the shaded gray. The spectrum was cut at 800 nm for BChl a with an appropriate short pass filter to minimize scattering.

Figure 7B:
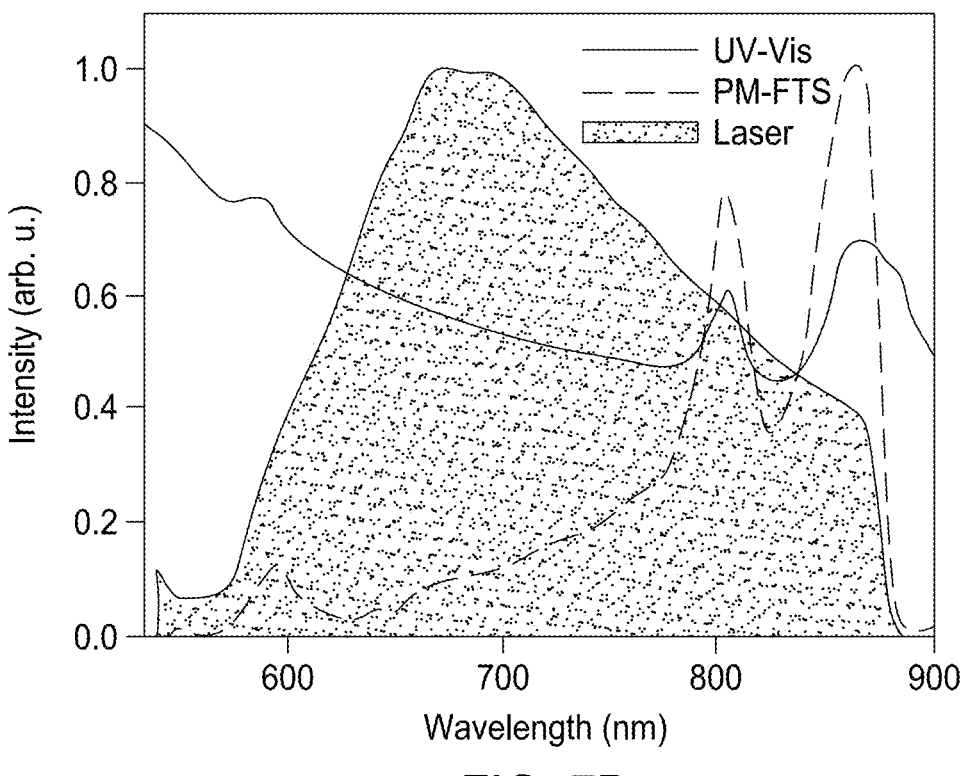

FIG. 7B is a graph showing linear fluorescence excitation of purple bacteria (dashed line) compared to the linear absorption measurement recorded by a commercial UV-Vis (solid line). Note that the UV-Vis spectrum has a large background due to scatter, which is eliminated in the fluorescence measurement. The cross-correlation laser spectrum that was used to perform the experiment is also shown by the shaded gray. The spectrum was cut at 875 nm via a short pass filter.

Corresponding reference numerals indicate corresponding parts throughout the several views of the drawings.

DETAILED DESCRIPTION

Example embodiments will now be described more fully with reference to the accompanying drawings.

To understand the effect of phase modulation on continuum generation, consider a periodic train of laser pulses with a repetition rate of $f_{rep}$ and a corresponding time $T_{rep}=1/f_{rep}$ between laser pulses. Sending the pulse train through an acoustic-optic modulator (AOM) that is modulated at a frequency $\Omega_i$ imparts a phase modulation, shifting the carrier-envelope phase by an increment of $\Omega_i T_{rep}$ between consecutive pulses. One can describe the electric field of the $m^{th}$ pulse in the pulse train as:

$$E_m(t) = A_m(t - mT_{rep})\cos[\omega_0(t - mT_{rep}) + m\Omega_i T_{rep}] \quad (1)$$

where $A_m(t-mT_{rep})$ is the pulse envelope and $\omega_0$ is the laser center frequency. To understand how AOM phase modulation of the relatively narrowband pump laser impacts continuum generation, consider the Kerr effect in the Yttrium Aluminum Garnet (YAG) crystal. As the electric field of the laser pulse traverses the crystal, it produces an intensity dependent refractive index n:

$$n = n_0 + n_2|E_m(t)|^2 \quad (2)$$

where $n_0$ is the linear refractive index, $n_2$ is the nonlinear refractive index of the material, and $|E_m(t)|^2$ is the intensity of the incident electric field. The relevant phenomenon that leads to super-continuum generation in condensed media is self-phase modulation, which describes the phase change caused by the time-dependent index of refraction $\Delta n=n-n_0$ in propagating through the medium. Assuming uniform focusing through the material of length l, self-phase modulation introduces a phase change of $$\Delta\varphi(t) = \frac{\omega_0 n_2}{c}|E_m(t)|^2 l \quad (3)$$

resulting in a corresponding frequency broadening $\Delta\omega(t)=-\partial(\Delta\varphi)/\partial t$. The output spectrum of the generated continuum is given by $$|E_m(\omega)|^2 = \left|\int_0^\infty E_m(t)e^{-i\omega_0 t + i\Delta\varphi(t)}dt\right|^2 \quad (4)$$

Within the slowing-varying approximation, i.e., $(\omega_0\tau_p \gg 1)$, where $\tau_p$ is the pulse duration, the rapidly oscillating terms in the integral will not contribute, and the broadening of the spectrum is determined by the time-dependence of the pulse envelope. The initial phase of the electric field given in Eq. (1) is still carried by the pulse during and after traveling through the medium, resulting in a broadened phase-modulated continuum. Note that the argument above is highly simplistic, assuming uniform focusing throughout the medium and ignoring other phenomena such as self-focusing, multi-photon ionization, and avalanche ionization that can modify the broadening effect. However, assuming any third-order optical nonlinear process, even non-instantaneous, the relevant generated field will be proportional to $$\mathcal{E}_m(t)\mathcal{E}_m^*(t')\mathcal{E}_m(t''),$$

where $\varepsilon_m(t)$ is the complex electric field. The continuum will thus carry a phase $m\Omega_i T_{rep} - m\Omega_i T_{rep} + m\Omega_i T_{rep} - m\Omega_i T_{rep}$, as predicted by the simplified model above. Furthermore, it has been previously demonstrated that independent white-light continua generated from the same laser source exhibit spectral interference, confirming the preservation of their relative phase after continuum generation.

The first implementations of linear and two-dimensional PM-FTS employed a step-scan, lock-in detection approach, recording the signals of interest by locking onto reference signals oscillating at the signal frequency. These reference signals were constructed from the spectrally-narrowed unused interferometer output which oscillates at the difference in AOM frequencies of the two interferometer arms. Use of the spectrally-narrowed reference signal enables physical under-sampling of the signal, making PM-FTS insensitive to mechanical noise. The authors of this disclosure have previously demonstrated a continuous scan, digital lock-in approach to phase-modulated fluorescence detected two-dimensional electronic spectroscopy (F-2DES). In the digital lock-in method, multiple signals were simultaneously digitized via a Data Acquisition (DAQ) Board. These signals include the signal from the sample, the spectrally-narrowed phase reference signal, and a mixer signal that measures the RF frequency difference of the AOMs in each interferometer. The mixer signal allows one to track any drifts in AOM frequency and to isolate signal contributions at the linear combination of the RF frequencies. The signals are recorded in the time domain at the laser repetition rate as the time delay between the two pulses is continuously varied. However, to retrieve the correct frequency axes, the precise time delay between the two arms must be known to interferometric precision. This can be obtained directly from the spectrally-narrowed phase reference signal which is recorded in parallel with the sample signal, interferometrically tracking the precise phase difference between the two arms of the interferometer during the continuous scan.

Figure 1:
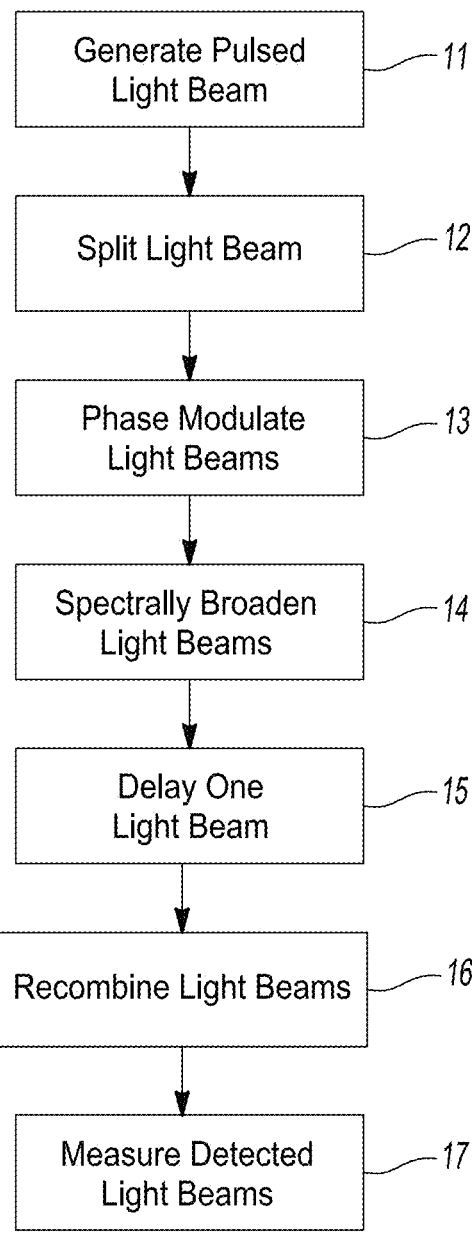
FIG. 1 is a flowchart depicting an improved technique for analyzing samples using spectroscopy.
Figure 2:
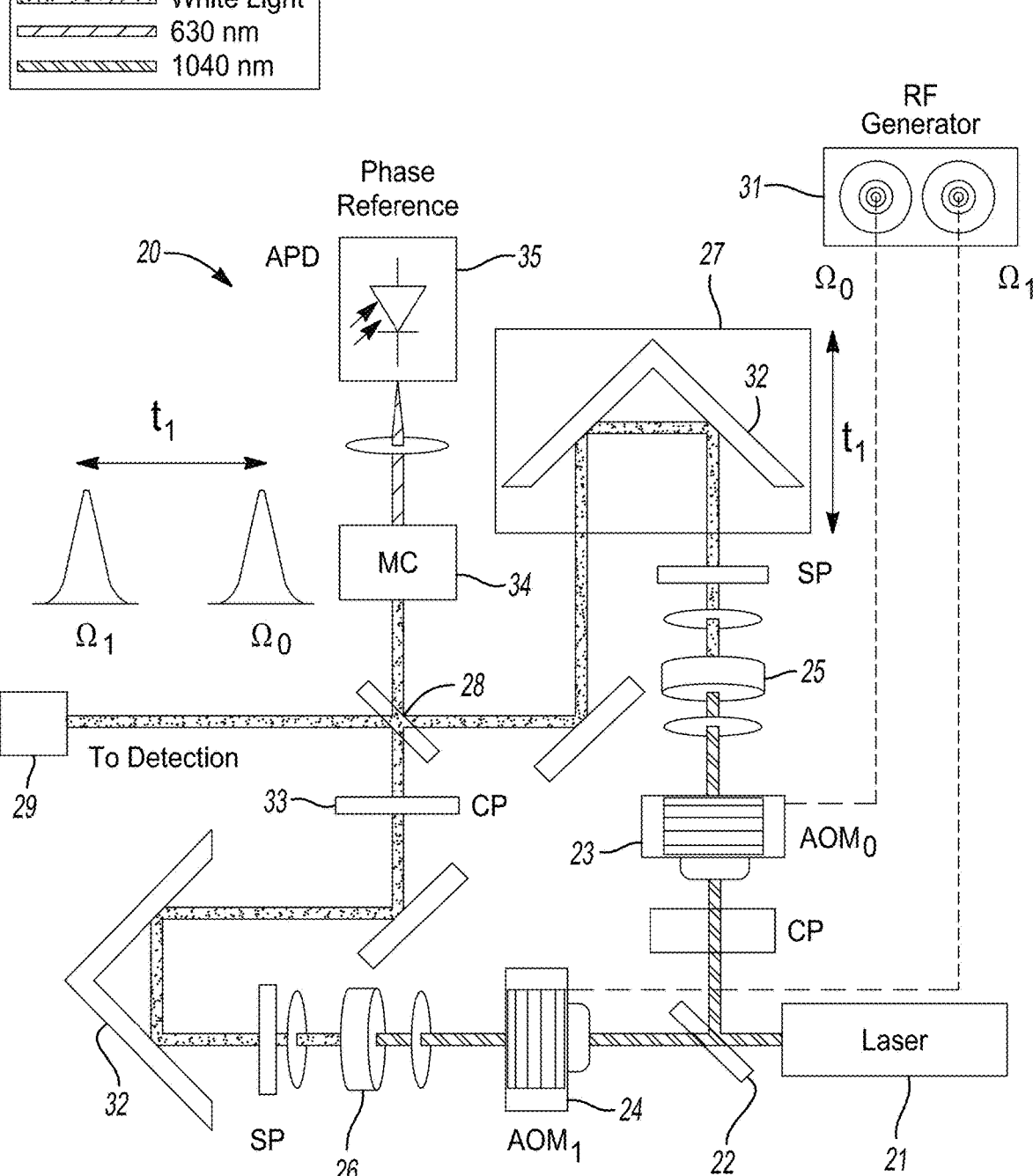
FIG. 2 is a diagram of an example arrangement for a spectrometer.

FIGS. 1 and 2 depict an improved technique for analyzing samples using spectroscopy. In an example implementation, the basis for phase-modulation Fourier transform spectroscopy is a Mach-Zehnder interferometer. As seen FIG. 2, the system 20 includes a laser 21, a beam splitter 22, a first modulator 23, a second modulator 24, a first continuum generator 25, a second continuum generator 26, a delay mechanism 27, a beam combiner 28 and at least one detector. It is to be understood that only the relevant components of the system are discussed in relation to FIG. 2, but that other optical components may be needed to control and manage the overall operation of the system.

In the example arrangement, the beamsplitter 22 is configured to receive the pulsed light beam from the laser 21. The first modulator 23 is disposed in a first light path of the two light paths with the first continuum generator 25 disposed downstream from the first modulator 23 in the first light path. Similarly, the second modulator 24 is disposed in a second light path of the two light paths with the second continuum generator 26 disposed downstream from the second modulator 24 in the second light path. Although acoustic-optic modulators are shown, other types of modulators also fall within the broader aspects of this disclosure.

In addition, a delay mechanism 27 is disposed in the second light path. In the example arrangement, the delay mechanism 27 is positioned downstream from the second continuum generator 26 and is implemented by a reflector mounted on a mechanical delay stage. The delay mechanism 27 could also be placed upstream from the second continuum generator 26 as well as other locations in the second light path. Other types of delay mechanisms are also contemplated by this disclosure. The beam combiner 28 is configured to receive the pulsed light beam from the first continuum generator 25 and the second continuum generator 26. Lastly, a first detector 29 is used to detect the sample output signal.

During operation and with reference to FIG. 1, a pulsed light beam is generated at 11 by the laser 11 and then split at 12 into two light paths by the beamsplitter 12. The pulsed light beam is in turn phase modulated at 13 in each of the two light paths, such that the pulsed light beam in each of the two light paths is modulated at a different frequency. It is also envisioned that the pulsed light beam may be modulated in only one of the two light paths. In this case, the pulsed light beam in the other light path would be modulated at its source at a laser repetition rate; such an arrangement would require a data acquisition card with a sufficiently high sampling rate.

The pulsed light beam in each of the two light paths is also spectrally broadened downstream from where the pulsed light beams are phase modulated as indicated at 14. Additionally, the pulsed light beam in one of the two light paths is delayed at 15, where the delaying of the pulsed light beam occurs downstream from the spectral broadening. The pulsed light beam from each of the two light paths are recombined at 16 to form a sample output signal which is then detected at 17 by the first detector 29.

For analysis, a sample is disposed in the light path downstream from spectral broadening. In one example, the sample is positioned downstream from the spectral broadening on one of the two light paths but prior to the beam combiner 28. In another example, the sample is positioned downstream from the beam combiner 28 but prior to the first detector 29.

In an example embodiment, pulsed light is output from a 1040 nm, 1 MHz Ytterbium amplified laser 21 (Spectra Physics Spirit-HE, 280 fs pulse duration) and split using a 50/50 beam splitter 22 (Evaporated Coating Inc. 1040-1600 nm, 3 mm thick), sending 3.75 W into each arm of the MZ interferometer. The reflected beam passes through a N-BK7 window (3 mm thick) to compensate for the difference in dispersion compared to the reflected arm.

In each arm, the 1040 nm fundamental is diffracted by an AOM (Isomet M1346-aQ(fc)-H). In the example embodiment, the AOMs 23, 24 contain quartz crystal for its high optical damage threshold of ~12 GW/cm$^2$ to withstand the orders of magnitude higher input power compared to previous implementations of PM-FTS in which continuum generation preceded the AOM modulation step. The first diffracted order, which is modulated with the driving RF frequency of the AOM, is used for continuum generation. The amplitude of each RF signal is adjusted, such that the first diffracted order in each arm has the same average power (~1 W). The non-diffracted zeroth order beams (~3 W) are safely dumped into beam blocks (Thorlabs LB2) using D-shaped mirrors. Unique modulation frequencies are generated by two outputs from an RF signal generator 31 (Novatech, 409B, 1 kHz resolution), and amplified to ~50 W (Mini-Circuits, ZHL-100W-52-s+) before being sent to the AOMs 23, 24. The amplifiers operate in the linear regime to avoid influence from higher harmonics. For measurements, $\Omega_0$=80 MHz and $\Omega_1$=79.977 MHz were used, resulting in signal that modulates at the difference of the AOM frequencies (23 kHz). To account for drifts in the AOM driving frequencies, one can take a portion of each output from the RF generator 31 and send them to a radio frequency mixer 38 (Mini-Circuits, ZAD-1-1+) to track fluctuations during the measurements.

The phase-modulated first order diffracted beams are focused into YAG crystals 25, 26 (8 mm thick, Newlight Photonics) using 5 cm focal length lenses (Thorlabs LA1131-AB) to generate supercontinua in each arm of the interferometer. The beam size, power, and focusing conditions are adjusted to be comparable between the two arms to produce continua that are as spectrally similar as possible. The beams are then collimated with 2.5 cm focal length lenses (Thorlabs LA1951-AB) and the residual fundamental light is filtered out using 950 nm short pass filters (Thorlabs, FESH0950). The final spectra of the continua in the visible span ~500-950 nm, with the red edge determined by the short pass filters. Each arm is directed into a retroreflector 32. Arm 1 is fixed; whereas, the retroreflector 32 in Arm 0 is mounted on a mechanical delay stage 27 (Newport, M-VP25XL) to vary the relative time delay. The two arms are then recombined with a 50/50 beam splitter 28, chosen to have a smooth and flat spectral response (Layertec, 106896, 1 mm thick). A NBK7 window 33 (1 mm thick) is placed in Arm 1 before recombination to compensate for the additional dispersion added to Arm 0 from the recombining beam splitter. One output of the MZ interferometer is spectrally narrowed to 2.4 nm FWHM centered at 630 nm using a monochromator 34 (Optometric, DMC1-03). The intensity of the spectrally narrowed two-pulse interference signal is measured on a photodiode 35 (Thorlabs PDA36A), serving as the phase reference for interferometric tracking of the time delay. In principle, any spectrally narrowed wavelength can be used for the phase reference. However, it was found that using a bluer wavelength was helpful for resolving the signal in the blue edge of the spectrum. The other output of the MZ interferometer is directed to the sample for absorption or fluorescence measurements as described below.

Figure 3:
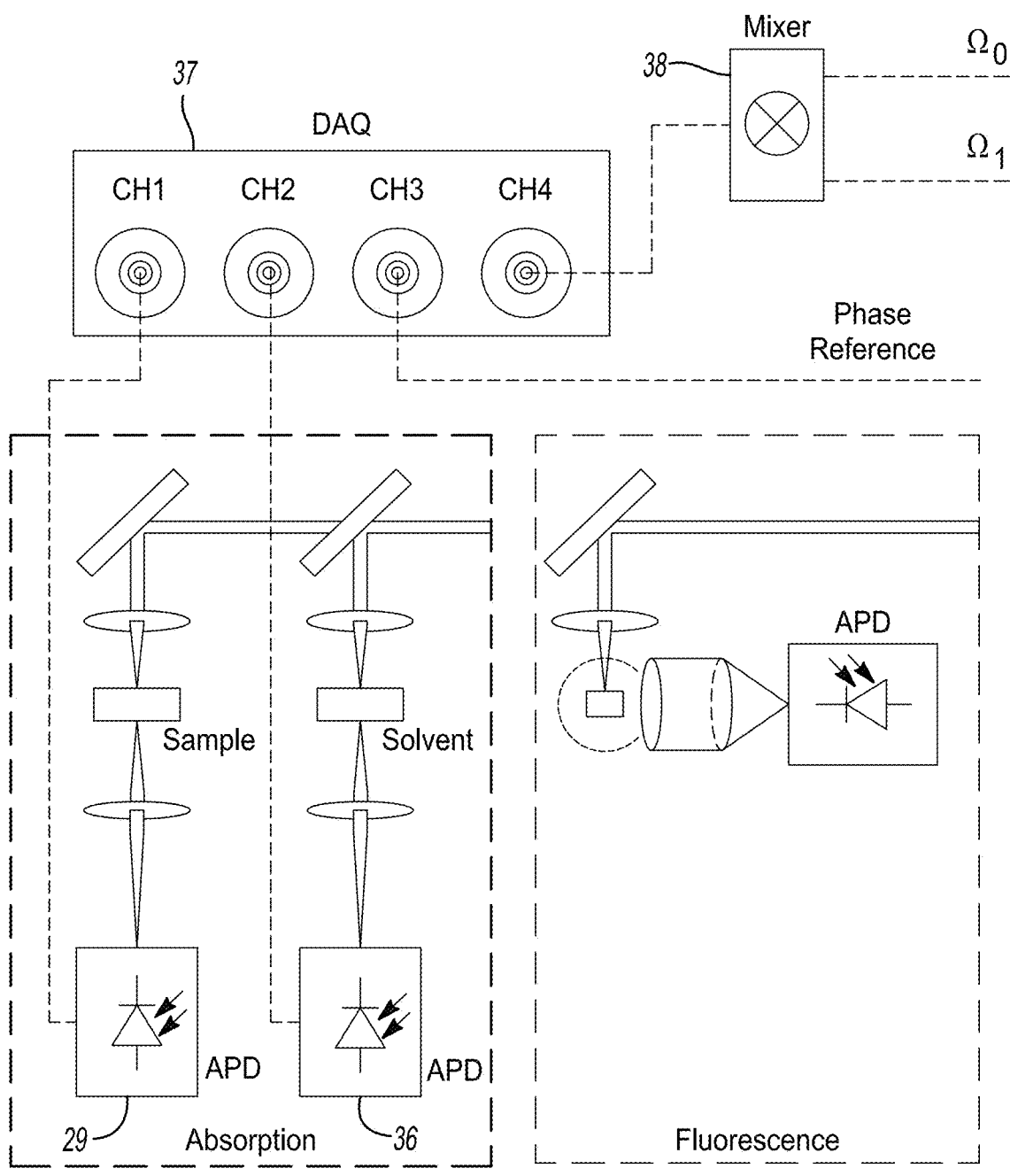
FIG. 3 is a diagram showing how signals are collected in the spectrometer.

FIG. 3 illustrates two sample signal collection geometries for absorption and fluorescence excitation measurements. In this example implementation, the sample of interest is placed in the "sample arm" between the signal combiner 28 and the detector 29 (e.g., photodiode). For absorption measurements, an additional reference spectrum is required to remove the effect of the laser spectrum and solvent absorption. This is achieved by picking off a small fraction of the beam in the sample arm using a 3 mm thick uncoated window and directing it into a "solvent arm" to a second detector 36, thereby simultaneously measuring the sample and reference spectra. This additional reference was omitted for the fluorescence measurements, but could also be implemented to remove the laser spectrum from the fluorescence excitation spectrum if desired. As depicted in FIG. 3, four signals are collected for linear absorption measurements via a DAQ card 37 (National Instruments, NI-USB 6366): the sample signal, the solvent reference, the phase reference, and the mixer signal. For the fluorescence measurements, only three channels were collected, omitting the solvent reference. The experiments were performed with continuous, rapid scanning of the time delay by moving the mechanical stage back and forth at a speed of 0.1 mm/s and with an acceleration of 100 mm/s$^2$ about time zero, which was determined using spectral interferometry. The total scanning range was −800 to 800 fs, yielding a spectral resolution of 1.25 THz (~2 nm).

For the linear absorption measurements, both the sample and solvent signals are focused onto photodiodes 29, 36 (Thorlabs PDA36A2) with 5 cm focal length achromatic lenses (Thorlabs AC254-050-AB). Two consecutive measurements are taken to extract the linear absorption spectrum from our PM-FTS set-up. First, solvent is measured in both the "sample arm" and the "solvent arm" to account for any spectral differences in the two arms or any differences in the detectors. Then, a second measurement is taken where the solvent in the "sample arm" is replaced with the sample of interest. If any drift of the continuum occurs, it can be corrected for using both detection arms. Using the two measurements, calculate the absorbance of the sample using:

$$OD = \underbrace{\log_{10}\left[\frac{I_{solv}^{solv.arm}}{I_{sam}^{sam.arm}}\right]}_{Measurement\,2} - \underbrace{\log_{10}\left[\frac{I_{solv}^{solv.arm}}{I_{solv}^{sam.arm}}\right]}_{Measurement\,1} \qquad (5)$$

where I denotes the intensity of the Fourier transformed signal in the frequency domain of the corresponding arm and sample as described below. The superscripts "sam. arm" and "solv. arm" represent the sample and the solvent arms respectively and the subscripts "sam" and "solv" stand for the measured cuvette contents in each arm. The four intensity I terms were obtained following a linear signal processing algorithm.

For the fluorescence excitation measurements, the emitted fluorescence signal is collected in the 90° detection geometry by a 2 inch diameter, 100 mm focal length lens, and then focused onto an avalanche photodiode (Hamamatsu, c12703-01). Any scattered laser light is blocked with long pass filters in front of the detector. Additionally, short pass filters are placed before the sample to remove wavelengths not absorbed by the sample to further minimize contributions from scattered laser light. The solvent arm without any sample or solvent was used as a reference arm using a photodiode (Thorlabs PDA36A2) to monitor the continuum throughout the experiment. The reported absorption and laser spectra have been corrected for the detector response. Because the detected fluorescence bandwidth is small, the detector correction was not applied in the case of the fluorescence excitation measurements. Additionally, laser spectra as well as fluorescence spectra reported in wavelength were scaled according to the appropriate Jacobian transformation. This factor is omitted in case of the absorption spectra since they are reported in optical density, i.e., as the ratio between two spectra. The Jacobian transformation ensures that the integral of the laser spectra and fluorescence spectra which is proportional to the energy is kept constant while transforming from wavelength to frequency.

Figure 4A:
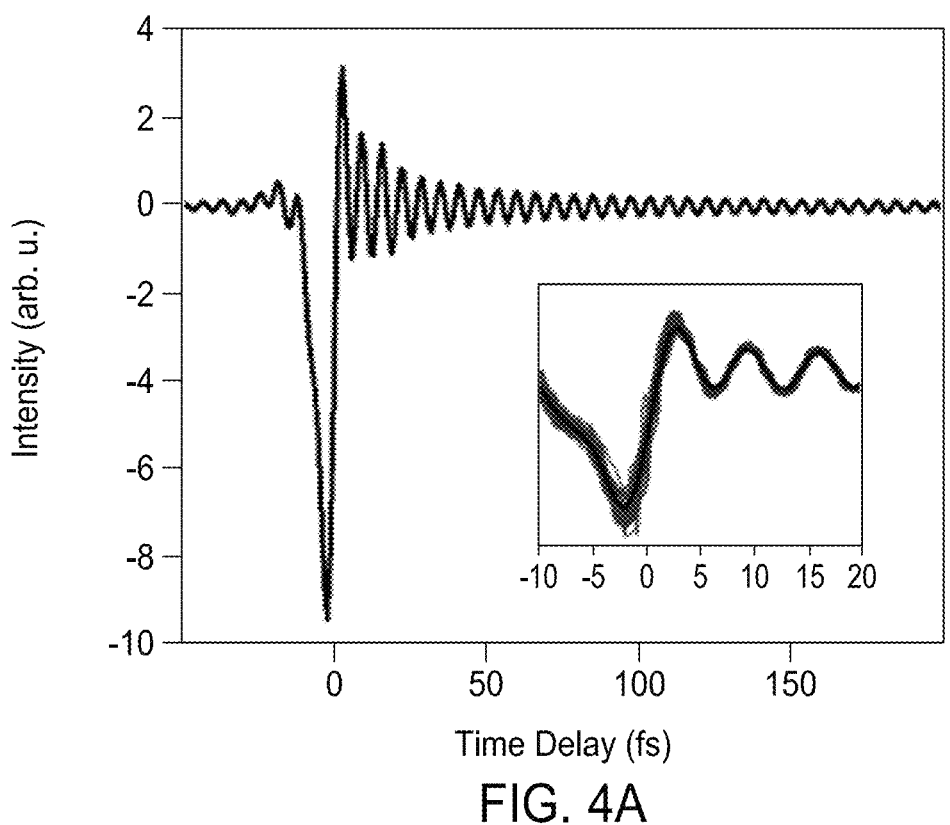
FIG. 4A is a graph showing time-domain interferograms retrieved from the two-pulse interference output of the Mach-Zender interferometer using a reference wavelength of 630 nm. Data corresponding to 48 back and forth stage scans is shown in the inset.
Figure 4B:
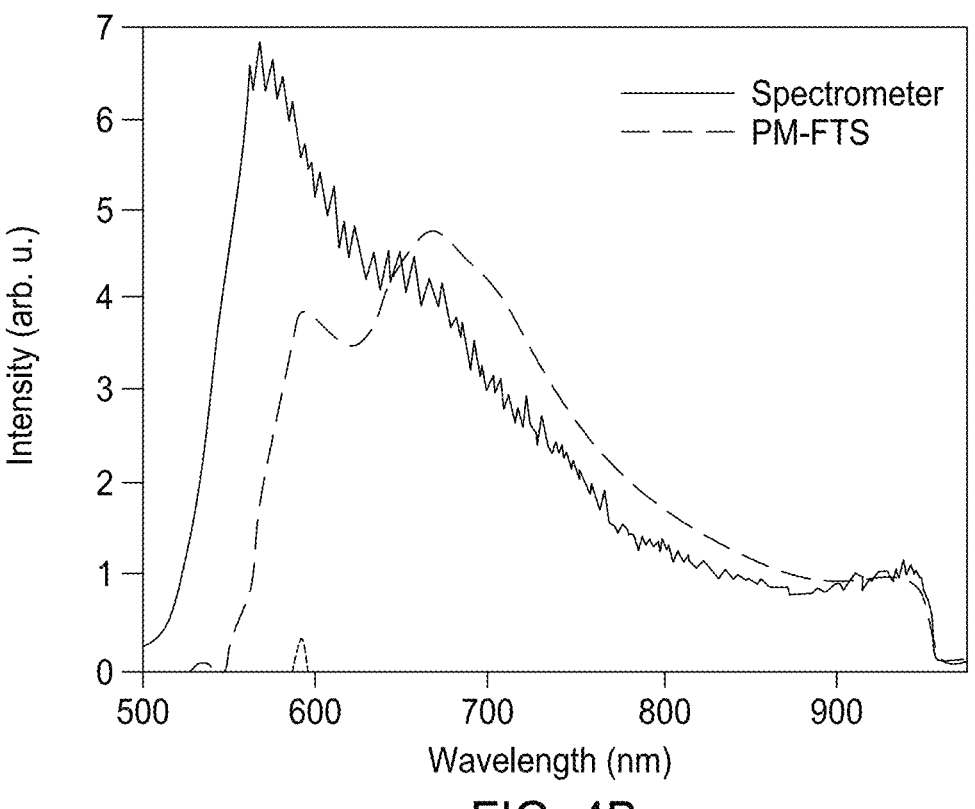
FIG. 4B is a graph showing the cross-correlation power spectrum retrieved using the broadband PM-FTS setup (dashed line), plotted against the spectrum measured using a commercial spectrometer after recombination from the MZ (solid line).

In FIG. 4A, a typical time domain interferogram representing the intensity cross-correlation measurement of the two continua is shown. The interferogram was measured with a total acquisition time of 2 min, for a total of 48 back-and-forth scans of the time delay (FIG. 4A inset). The back-and-forth scans are well overlapped, validating the accuracy of the interferometric time delay tracking. Before Fourier transformation, all the scans in the time domain are averaged (FIG. 4A, black curve). The asymmetry of the interferogram stems from differences in the spectral phase of the two continua. While we aimed to match the dispersion of the two arms of the MZ, it is likely that the focus positions in the 8 mm YAG crystals are slightly different, yielding similar spectra with different spectral phases. The retrieved cross-correlation spectrum obtained from the Fourier transform of the time-domain signal is shown in FIG. 4B (dashed curve). For comparison, a representative spectrum of the continuum from one arm of the MZ measured via a commercial fiber-coupled spectrometer (Ocean Optics, USB-2000) in shown in FIG. 4B. The spectrum is typical for continuum generation via YAG spanning from ~500-950 nm with a maximum intensity of ~600 nm. The continuum also reaches into the near-infrared, but is truncated in this setup by the short pass filter at 950 nm used to remove the fundamental. The measured cross-correlation spectrum with PM-FTS agrees well with the reference spectrum for long wavelengths, while the intensity of the shorter wavelengths is reduced in the PM-FTS spectrum. The discrepancy at short wavelengths is due to intensity and relative phase fluctuations of the white light continua which are generally less stable at wavelengths farthest from the fundamental. To characterize the spectral differences and the stability of the two continua, 500 spectra with 3 ms integration time on the Ocean Optics spectrometer are collected for both arms with the AOM frequencies matched to observe spectral interference, and separate spectra for each arm. There is clear spectral interference across nearly the entire bandwidth in any single spectrum measured, with poorer fringe contrast at shorter wavelengths. Thus, it was shown that the spectra of the two arms are very similar, and exhibit significant intensity fluctuations at shorter wavelengths.

Figure 5A:
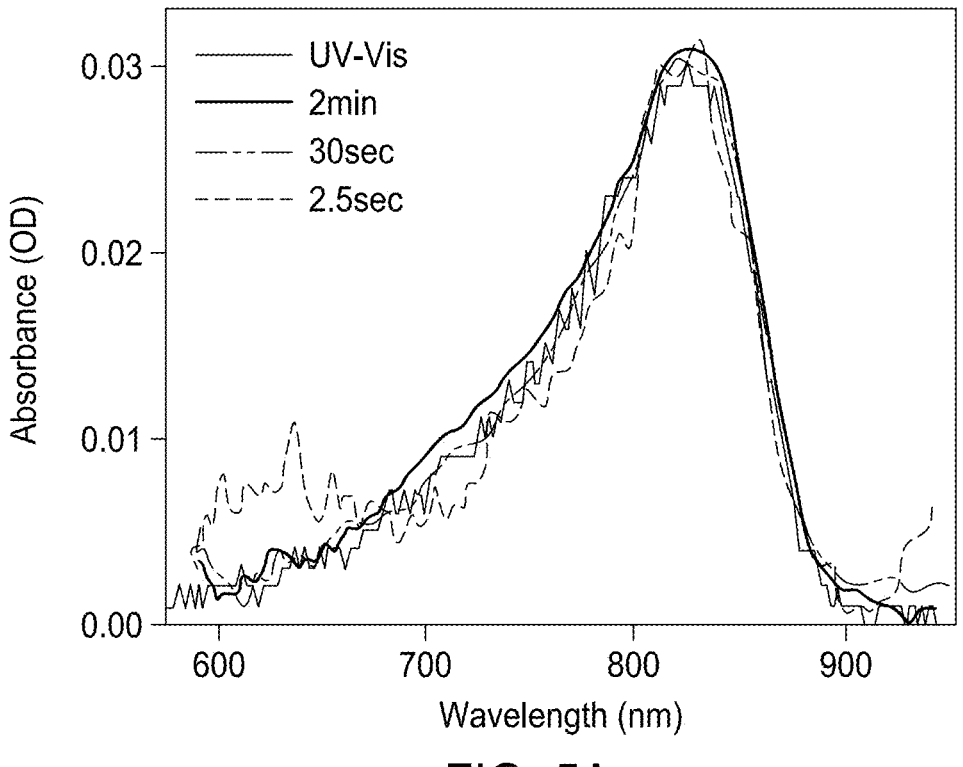
FIG. 5A is a graph showing a comparison of linear absorption measurements of IR140 made by PM-FTS and a commercial UV-Vis spectrometer. The solid, dashed and dotted curve were extracted by only averaging over part of the full dataset corresponding to 2 min, 30 sec, and 2.5 sec of measurement time respectively.
Figure 5B:
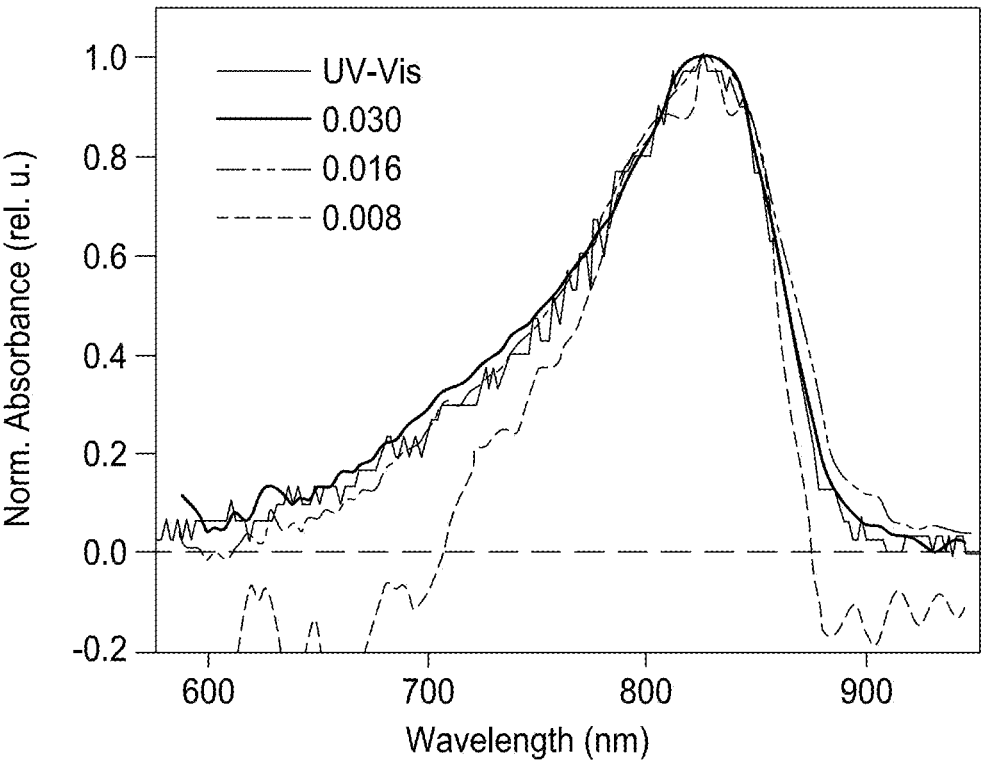
FIG. 5B is a graph showing concentration dependence over a measurement time of 2 minutes.

First, the technical capabilities of the above arrangement are demonstrated, such as measurement time and sensitivity, on a dye, IR140 (Exciton), in ethanol. The absorption spectrum of IR140 consists of one single broad absorption peak with its maximum at ~820 nm (FIGS. 5A and 5B, black solid line). For the absorption measurements of IR140, a 1 mm pathlength cuvette is used. In FIG. 5A, the retrieved absorption spectrum is compered via PM-FTS for several measurement times using a sample with OD of 0.03 and a pulse energy of 10 pJ. All the traces were extracted from a single dataset of 48 total back and forth scans. The 2 min of measurement time trace corresponds to averaging all 48 scans, while fractions of the full dataset (12 scans and 1 scan) were averaged corresponding to 30 sec and 2.5 sec of data collection. In all cases, the spectral shape and intensity of the spectrum measured with PM-FTS is consistent with the spectrum measured with a commercial dispersive UV-Vis spectrometer. The signal-to-noise ratio (SNR) is visibly lower for the 2.5 sec measurement as expected, but one can still resolve the main absorption peak well. Increasing the data acquisition time to 30 sec, one can see a dramatic improvement in SNR. The experimental measurement time for high SNR data could be further reduced by increasing the stage speed. In FIG. 5B, the sensitivity of the above arrangement is characterized for measuring lower concentrations by diluting the IR140 sample to a maximum OD of 0.016 and 0.008 (light blue lines) and comparing the normalized absorption spectra to the normalized spectrum of IR140 with an OD of 0.03 measured with PM-FTS (dark blue line) and a commercial UV-Vis spectrometer (black line). The main absorption feature is reproduced well for both dilutions. While the above arrangement can still resolve the main absorption feature for the lowest concentration, it has reduced accuracy in the regions with very low absorbance. However, for the concentration corresponding to an OD of 0.016, a comparable SNR to approximately double the concentration is observed. Furthermore, measurements were performed at different pulse energies demonstrating that one can retrieve spectra with reasonable SNR with pulse energies of 1 pJ to 15 pJ. The ability to perform rapid measurements with low excitation energies is particularly important for samples that are susceptible to photodamage or for avoiding higher-order effects such as exciton-exciton annihilation.

Figure 6A:
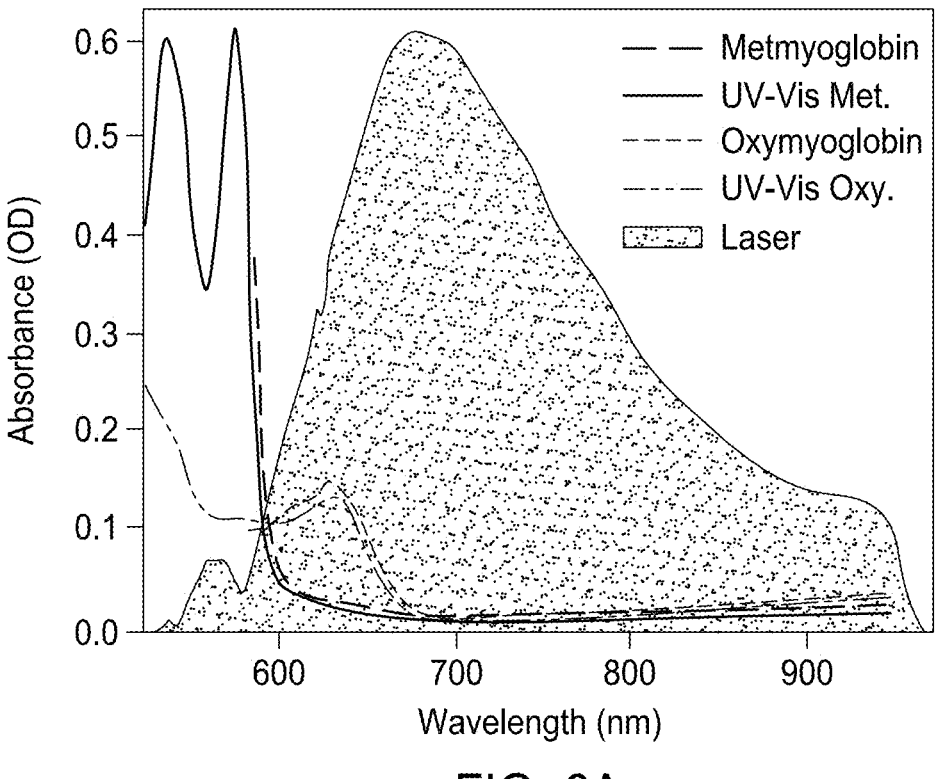
FIG. 6A is a graph showing linear absorption spectra of biological pigments measured via PM-FTS, where Metmyoglobin (longer dashes line) and oxomyoglobin (shorter dashes line) are compared to the linear absorption measurement of the two species recorded by a commercial UV-Vis spectrometer (solid line and mixed dashed line). The PM-FTS measurement time was 2 minutes.

The PM-FTS setup is broadly applicable to a myriad of samples absorbing in the range of ~550 nm to 950 nm. Its capabilities are further illustrated by making linear absorption measurements on several biological samples. As a first example, study different oxidation species of myoglobin. Myoglobin was the first protein to have its X-ray structure determined. It is primarily located in the muscles where it acts as an oxygen storage protein. The oxidized form of myoglobin, metmyoglobin has a characteristic brown color, while binding molecular oxygen results in the red oxymyoglobin species. Metmyoglobin and oxymyoglobin were prepared in potassium phosphate. In FIG. 6A, it is shown that the absorption spectra measured via PM-FTS (dashed lines) as well as via a commercial UV-Vis spectrometer (solid lines), showing good agreement between the two methods. While both samples have little to no absorption from 950 nm to 700 nm, one can clearly distinguish oxy- from metmyoglobin from the spectral features on the blue edge of the spectrum. As seen by the laser spectrum (grey) in FIG. 6A, the retrieved cross-correlation spectrum had little spectral intensity in the blue region during these measurements, limiting the spectral range to >600 nm. A combination of poorer relative phase and intensity stability of the continua in the blue results in poor spectral interference in this wavelength range. It is noted that an extensive study of the relative phase stability of dual continua generated in YAG reports larger deviations at shorter wavelengths, consistent with these observations. Extending the measurement further into the blue could be achieved by improving the continuum stability and generating the continuum in other materials, such as $CaF_2$ which are capable of generating bluer continua. Further note that the current cross-correlation continuum spectrum shows some variation between days, as seen by the different laser spectra shown in FIGS. 6A and 6B, which changes the measurable spectral range.

Figure 6B:
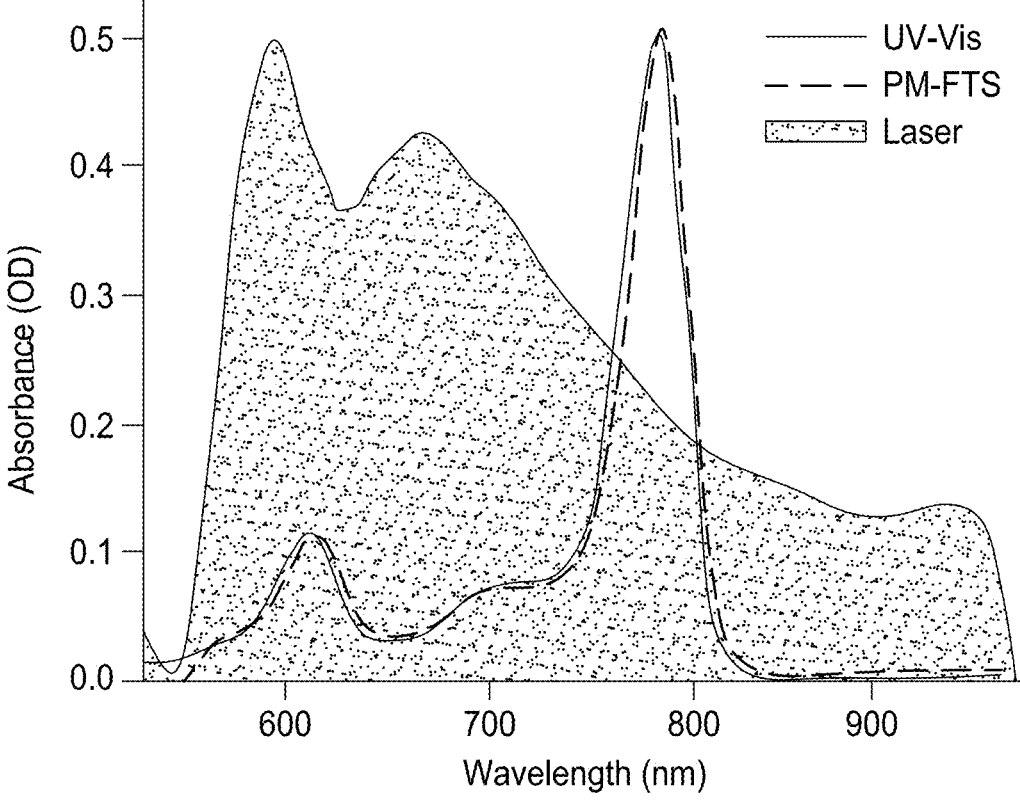
FIG. 6B is a graph showing BChl a (dashed line) compared to the absorption spectrum of BChl a measured using a UV-Vis spectrometer (solid line).

As an additional sample, Bacteriochlorophyll a (BChl a), one of the main pigments in the photosynthetic apparatus of bacteria such as heliobacteria, green sulfur bacteria and purple bacteria, was studied. The structure of BChl a consists of a central bacteriochlorin unit coordinating a $Mg^{2+}$-ion. The bacteriochlorin unit gives rise to two distinct absorption bands: a strong absorption at ~800 nm called $Q_y$, and a weaker absorption at ~600 nm called $Q_x$. Additionally, the absorption spectrum exhibits a strong vibronic shoulder of the $Q_y$ peak at ~700 nm. The measured absorption via UV-Vis spectrometer (solid black line) and via PM-FTS (dashed purple line) in FIG. 6B show excellent agreement, highlighting the accuracy of the PM-FTS approach.

In addition to linear absorption measurements, linear fluorescence excitation spectra was acquired using PM-FTS. The information content is comparable to linear absorption measurements, but fluorescence detection can have some advantages for fluorescent molecules and scattering samples. Fluorescence measurements are background-free, enabled by spectral filtering and the ability to collect signal in the 90° geometry. To avoid any scattering from the excitation beams reaching the detector, additional short pass filters were used before the sample. The fluorescence excitation spectrum of BChl a (FIG. 7A, purple dashed line) shows the same characteristic features as the linear absorption spectrum. The peak ratio is different between the linear fluorescence excitation and absorption measurements reflecting the fact that the fluorescence excitation spectrum is modulated by the spectral shape of the cross-correlation spectrum (FIG. 7A). Note that because the laser spectrum was not removed, the reported fluorescence excitation spectra are the product of the fluorescence excitation spectrum $g(\omega)$ and the cross-correlation spectrum of the continua. In principle, this could be removed by simultaneously collecting a cross-correlation reference spectrum similar to the "solvent arm" in the absorption measurements.

Due to the background-free nature of fluorescence detection, measuring fluorescence excitation spectra with PM-FTS has great promise for highly scattering samples, such as whole cells. As a proof of principle, one can measure the fluorescence excitation spectrum of whole cells of the purple bacterium *Rhodoblastus acidophilus*. While the primary absorber in purple bacteria is BChl a, the absorption spectrum of the whole cells exhibits additional peaks and spectral shifts compared to the absorption spectrum of monomeric BChl a (FIG. 7A). These arise from the antenna and reaction center pigment-protein complexes in which the protein environment tunes the BChl a transitions and controls excitonic coupling between the pigments. The spectrum exhibits two main absorption bands above 750 nm: one at 800 nm which corresponds to the absorption of the B800 band of light-harvesting complex 2 (LH2), and a broader absorption peaking at 850-875 nm containing the B850 band of LH2 and the absorption of light-harvesting complex 1 (LH1) as well as the absorption of the reaction center (RC). Furthermore, one can identify the absorption of $Q_x$ at ~600 nm arising from the BChl a present in LH1, LH2 and the RC. Although these features are identifiable in the absorption spectrum using a UV-Vis spectrometer (FIG. 7B, black solid line), they are less pronounced due to the large background from scattering. In the fluorescence excitation spectrum (dashed green line), the significant scattering contribution is avoided by using short pass filter before the sample (in this case at 875 nm, FIG. 7B, gray curve) as well as long pass filters for the fluorescence. This result highlights the advantages of fluorescence detection for studying highly scattering samples and the promise of PM-FTS for hyperspectral imaging of whole cells.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for analyzing a sample using spectroscopy, comprising:
   generating, by a laser, a pulsed light beam;
   splitting, by a first beamsplitter, the pulsed light beam into two light paths;
   phase modulating the pulsed light beam in at least one of the two light paths, such that the pulsed light beam in each of the two light paths is modulated at a different frequency;

spectrally broadening the pulsed light beam in each of the two light paths, where the spectrally broadening of the pulsed light beam occurs downstream from the phase modulation;
   delaying, by a delay mechanism, the pulsed light beam in one of the two light paths, where the delaying of the pulsed light beam occurs downstream from the spectral broadening;
   recombining, by a beam combiner, the pulsed light beam from each of the two light paths to form a sample output signal;
   disposing the sample a light path downstream from the spectral broadening; and
   detecting, by a detector, the output signal.

2. The method of claim 1 further comprises applying, by a computer processor, a Fourier transform to the sample output signal.

3. The method of claim 1 further comprises phase modulating the pulsed light using an acoustic-optic modulator.

4. The method of claim 1 further comprises spectrally broadening the pulsed light using Yttrium aluminum garnet.

5. The method of claim 1 wherein the sample is positioned downstream from the spectral broadening and prior to the beam combiner.

6. The method of claim 1 wherein the sample is positioned downstream from the beam combiner and prior to the detector.

7. The method of claim 1 further comprises tracking time delay between the two light paths.

8. The method of claim 1 further comprise tracking and correcting drift in modulation frequencies.

9. The method of claim 1 further comprises measuring a reference spectra of the pulsed light beam prior to it passing through the sample and measuring absorption of the sample using the reference spectra and the output signal captured by the detector.

10. A system for analyzing a sample using spectroscopy, comprising:
    a laser configured to generate a pulsed light beam;
    a beamsplitter configured to receive the pulsed light beam from the laser and split the pulsed light beam into two light paths;
    a first modulator disposed in a first light path of the two light paths and operates to phase modulate the pulsed light beam therein at a first frequency;
    a second modulator disposed in a second light path of the two light paths and operates phase modulate the pulsed light beam therein at a second frequency which differs from the first frequency;
    a first continuum generator disposed on the first light path downstream from the first modulator and operates to spectrally broaden the pulsed light beam;
    a second continuum generator disposed on the second light path downstream from the second modulator and operates to spectrally broadening the pulsed light beam;
    a delay mechanism disposed in the second light path downstream from the second continuum generator and operates to delay the pulsed light beam;
    a beam combiner configured to receive the pulsed light beam from the first continuum generator and the second continuum generator and operates to form an output signal; and
    a first detector configured to detect the output signal.

11. The system of claim 10 further comprises a computer processor interfaced with the first detector and configured to apply a Fourier transform to the sample output signal.

12. The system of claim 10 wherein at least one of the first modulator and the second modulator is further defined as an acoustic-optic modulator.

13. The system of claim 10 wherein at least one of the first continuum generator and the second continuum generator is further defined as a Yttrium aluminum garnet.

14. The system of claim 10 wherein the delay mechanism is further defined as a mechanical delay stage.

15. The system of claim 10 wherein the sample is disposed downstream from the beam combiner and prior to the first detector.

16. The system of claim 15 further comprises a second detector configured to receive a portion of the output signal before it passes through the sample.

17. A method for analyzing a sample using spectroscopy, comprising:

generating, by a laser, a pulsed light beam;

splitting, by a first beamsplitter, the pulsed light beam into two light paths;

phase modulating the pulsed light beam in each of the two light paths, such that the pulsed light beam in each of the two light paths is modulated at a different frequency;

spectrally broadening the pulsed light beam in each of the two light paths, where the spectrally broadening of the pulsed light beam occurs downstream from the phase modulation;

delaying, by a delay mechanism, the pulsed light beam in one of the two light paths, where the delaying of the pulsed light beam occurs downstream from the spectral broadening;

recombining, by a beam combiner, the pulsed light beam from each of the two light paths to form a sample output signal;

disposing the sample a light path downstream from the spectral broadening; and detecting, by a detector, the output signal.

\* \* \* \* \*